(12) United States Patent
Spitsberg et al.

(10) Patent No.: US 7,326,468 B2
(45) Date of Patent: Feb. 5, 2008

(54) THERMAL/ENVIRONMENTAL BARRIER COATING FOR SILICON-COMPRISING MATERIALS

(75) Inventors: Irene Spitsberg, Loveland, OH (US); Christine Govern, Cincinnati, OH (US); Bangalore Aswatha Nagaraj, West Chester, OH (US); Brian Thomas Hazel, West Chester, OH (US); David Joseph Mitchell, Huntington Beach, CA (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 11/040,157

(22) Filed: Jan. 21, 2005

(65) Prior Publication Data
US 2006/0166016 A1    Jul. 27, 2006

(51) Int. Cl.
*B32B 9/00* (2006.01)
*F03B 3/12* (2006.01)

(52) U.S. Cl. .............. 428/446; 428/701; 428/702; 428/698; 416/241 B

(58) Field of Classification Search .............. 428/697, 428/699, 701, 702; 416/241 B
See application file for complete search history.

(56) References Cited

U.S. PATENT DOCUMENTS

| | | | |
|---|---|---|---|
| 5,488,018 A * | 1/1996 | Limaye ............ 501/104 |
| 5,641,440 A | 6/1997 | Talmy et al. |
| 5,985,470 A | 11/1999 | Spitsberg et al. |
| 6,129,954 A | 10/2000 | Spitsberg et al. |
| 6,197,424 B1 | 3/2001 | Morrison et al. |
| 6,352,790 B1 | 3/2002 | Eaton et al. |
| 6,365,288 B1 | 4/2002 | Eaton et al. |
| 6,387,456 B1 | 5/2002 | Eaton, Jr. et al. |
| 6,444,335 B1 | 9/2002 | Wang et al. |
| 6,485,848 B1 | 11/2002 | Wang et al. |
| 6,558,814 B2 | 5/2003 | Spitsberg et al. |
| 6,565,990 B2 | 5/2003 | Bewlay et al. |
| 6,602,356 B1 | 8/2003 | Nagaraj et al. |
| 6,607,852 B2 * | 8/2003 | Spitsberg et al. ........... 428/702 |
| 6,627,323 B2 | 9/2003 | Nagaraj et al. |
| 6,699,607 B1 | 3/2004 | Spitsberg |
| 6,730,422 B2 | 5/2004 | Litton et al. |
| 6,733,907 B2 | 5/2004 | Morrison et al. |

(Continued)

OTHER PUBLICATIONS

Zhu, Dongming et al, Thermal and Environmental Barrier Coatings for Advanced Propulsion Engine Systems, published in the Proceedings of AHS International 60th Annual Forum and Technology Display, Jun. 7-10, 2004, Baltimore, Maryland, pp. 703-709.

(Continued)

*Primary Examiner*—Jennifer McNeil
*Assistant Examiner*—Daniel Miller
(74) *Attorney, Agent, or Firm*—Donald E. Hasse; Hasse & Nesbitt LLC

(57) ABSTRACT

An article comprising a substrate formed of a silicon-comprising material, such as an article exposed to the hostile thermal environment of a gas turbine engine. The article further comprises an environmental barrier layer, e.g., an alkaline earth metal aluminosilicate, and a top coat comprising hafnia stabilized with from about 0.5 mole % to about 10 mole % of an oxide of a metal selected from the group consisting of magnesium, calcium, scandium, yttrium, and lanthanide metals, and mixtures thereof. The article optionally comprises a transition layer between the environmental barrier layer and the top coat. A method for preparing a thermal/environmental barrier coating on a substrate formed of a silicon-comprising material is also disclosed.

27 Claims, 1 Drawing Sheet

U.S. PATENT DOCUMENTS

| | | | |
|---|---|---|---|
| 6,733,908 B1 | 5/2004 | Lee et al. | |
| 6,740,364 B2 | 5/2004 | Lau et al. | |
| 6,759,151 B1 | 7/2004 | Lee | |
| 6,787,195 B2 | 9/2004 | Wang et al. | |
| 6,890,668 B2 | 5/2005 | Bruce et al. | |
| 2003/0066578 A1 | 4/2003 | Jackson et al. | |
| 2003/0118873 A1* | 6/2003 | Murphy | 428/701 |
| 2003/0152797 A1 | 8/2003 | Darolia et al. | |
| 2003/0157361 A1 | 8/2003 | Nagaraj et al. | |
| 2003/0207155 A1 | 11/2003 | Morrison et al. | |
| 2004/0115471 A1 | 6/2004 | Nagaraj et al. | |
| 2004/0175597 A1 | 9/2004 | Litton et al. | |
| 2005/0013993 A1 | 1/2005 | Li et al. | |
| 2005/0255648 A1* | 11/2005 | Bhatia et al. | 438/218 |

OTHER PUBLICATIONS

Mulpuri, R.P., et al., Synthesis of Mullite Coatings by Chemical Vapor Deposition, Journal of Materials Research, 11 [6] 1315-1324 (1996).

Zhu, Dongming et al, Durability and Design Issues of Thermal/Environmental Barrier Coatings on SiC-Based Ceramics under 1650° C Test Condistions, The 28th International Cocoa Beach Conference on Advanced Ceramics and Composites, Jan. 29, 2004.

Basu, S.N., et al., Functionally Graded CVD Mullite Environmental Barrier Coatings, Department of Manufacturing Engineering, Boston University, Brookline, MA, presented at The 28th International Cocoa Beach Conference on Advanced Ceramics and Composites, Jan. 29, 2004.

U.S. Appl. No. 11/040,156, filed Jan. 21, 2005, Spitsberg et al.

U.S. Appl. No. 11/040,158, filed Jan. 21, 2005, Spitsberg et al.

U.S. Appl. No. 11/040,855, filed Jan. 21, 2005, Spitsberg et al.

U.S. Appl. No. 11/040,991, filed Jan. 21, 2005, Spitsberg et al.

U.S. Appl. No. 11/006,292, filed Dec. 6, 2004, Boutwell et al.

U.S. Appl. No. 11/006,368, filed Dec. 6, 2004, Govern et al.

U.S. Appl. No. 11/003,244, filed Dec. 3, 2004, Gorman et al.

* cited by examiner

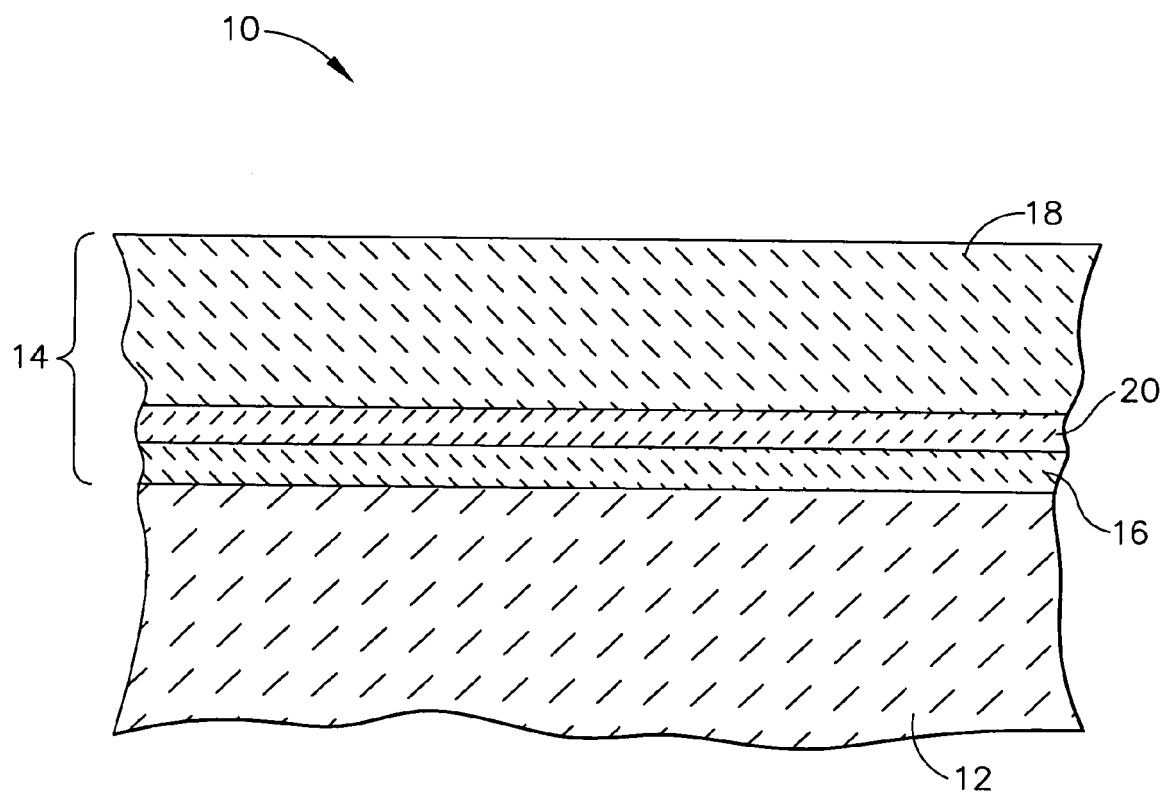

THERMAL/ENVIRONMENTAL BARRIER COATING FOR SILICON-COMPRISING MATERIALS

STATEMENT REGARDING FEDERALLY SPONSORED RESEARCH

This invention was made with Government support under Contract No. N00421-00-3-0536 awarded by the Navy. The Government may have certain rights to the invention.

FIELD OF THE INVENTION

This invention relates to coating systems suitable for protecting components exposed to high-temperature environments, such as the hostile thermal environment of a gas turbine engine. More particularly, this invention is directed to a thermal/environmental barrier coating system for a substrate formed of a material comprising silicon.

BACKGROUND OF THE INVENTION

Higher operating temperatures for gas turbine engines are sought in order to increase efficiency. However, as operating temperatures increase, the high temperature durability of the components of the engine must correspondingly increase. Significant advances in high temperature capabilities have been achieved through formulation of iron, nickel and cobalt-base superalloys. While superalloys have found wide use for components in gas turbine engines, alternative materials have been proposed. Materials comprising silicon, particularly those with silicon carbide (SiC) as a matrix material and/or reinforcing material, have been considered for high temperature applications, such as combustor and other hot section components of gas turbine engines.

In many applications, a protective coating is beneficial for Si-comprising materials. For example, protection with a suitable thermal-insulating layer reduces the operating temperature and thermal gradient through the material. Additionally, such coatings may provide environmental protection by inhibiting the major mechanism for degradation of Si-comprising materials in a corrosive water-comprising environment, namely, the formation of volatile silicon hydroxide ($Si(OH)_4$) products. Consequently, besides low thermal conductivity, a thermal barrier coating system for a Si-comprising material should be stable in high temperature environments comprising water vapor. Other important properties for the coating material include a coefficient of thermal expansion (CTE) compatible with the Si-comprising material, low permeability for oxidants, and chemical compatibility with the Si-comprising material and silica scale formed from oxidation. As a result, suitable protective coatings for gas turbine engine components formed of Si-comprising materials have a dual function, serving as a thermal barrier and simultaneously providing environmental protection. A coating system having this dual function is often termed a thermal/environmental barrier coating (T/EBC) system.

While various single-layer and multilayer T/EBC systems have been investigated, each has shortcomings relating to the above-noted requirements and properties for compatibility with Si-comprising materials. For example, a coating of zirconia partially or fully stabilized with yttria (YSZ) as a thermal barrier layer exhibits excellent environmental resistance by itself since it does not comprise silica. However, YSZ does not adhere well to Si-comprising materials (SiC or silicon) because of a CTE mismatch (about 10 ppm/° C. for YSZ as compared to about 4.9 ppm/° C. for SiC/SiC composites). Mullite ($3Al_2O_3.2SiO_2$) has been proposed as a bond coat for YSZ on Si-comprising substrate materials to compensate for this difference in CTE (mullite has a CTE of about 5.5 ppm/° C.). However, mullite exhibits significant silica activity and volatilization at high temperatures if water vapor is present.

Barium-strontium-aluminosilicate (BSAS) coatings suitable for Si-comprising materials exposed to temperatures of up to 2400° F. (about 1315° C.) have also been proposed. BSAS provides excellent environmental protection and exhibits good thermal barrier properties due to its low thermal conductivity. However, for application temperatures approaching the melting temperature of BSAS (about 1700° C.), a BSAS protective coating requires a thermal-insulating top coat. The addition of such a top coat on a BSAS bond coat can significantly increase the overall thickness of the T/EBC system. As application temperatures increase beyond the thermal capability of a Si-comprising material (limited by a melting temperature of about 2560° F. (about 1404° C.) for silicon) and the surface temperatures increase (up to 3100° F., or about 1704° C.), still thicker coatings capable of withstanding higher thermal gradients are required. As coating thickness increases, strain energy due to the CTE mismatch between individual coating layers and the substrate also increases, which can cause debonding and spallation of the coating system. Application of a top layer by EB-PVD methods on components such as airfoils results in a top coat having a columnar strain-tolerant microstructure. This helps to reduce stress and partially release strain energy, rendering the T/EBC more durable. However, high surface temperatures can cause rapid sintering of the top coat, which leads to less of the strain-tolerant microstructure and the development of horizontal and through-thickness cracks.

Accordingly, there is a need for improved T/EBC systems for silicon-comprising materials that enable such materials to be used at application temperatures beyond the melting temperature of silicon.

BRIEF DESCRIPTION OF THE INVENTION

In one aspect, the invention relates to an article comprising a substrate formed of a silicon-comprising material; an environmental barrier layer overlying the substrate; and a top coat overlying the environmental barrier layer, the top coat comprising hafnia stabilized with from about 0.5 mole % to about 10 mole % of an oxide of a metal selected from the group consisting of magnesium, calcium, scandium, yttrium, and lanthanide metals, and mixtures thereof.

In another aspect, the invention relates to an article comprising a substrate formed of a silicon-comprising material; an environmental barrier layer overlying the substrate; a transition layer overlying the environmental barrier layer; and a top coat overlying the transition layer, the top coat comprising hafnia stabilized with from about 0.5 mole % to about 10 mole % of an oxide of a metal selected from the group consisting of magnesium, calcium, scandium, yttrium, and lanthanide metals, and mixtures thereof.

The invention also relates to a gas turbine engine component comprising a substrate formed of a silicon-comprising material and having a thermal/environmental barrier coating system on a surface thereof, the thermal/environmental barrier coating system comprising an environmental barrier layer overlying the substrate and having a thickness of from about 25 to about 500 micrometers; optionally, a transition layer overlying the environmental barrier layer, the transition layer having a thickness of from about 25 to about 500 micrometers; and a top coat overlying the environmental barrier layer and any transition layer, the top coat comprising hafnia stabilized with from about 0.5 mole % to about 10 mole % of an oxide of a metal selected from the group consisting of magnesium, calcium, scandium, yttrium, and lanthanide metals, and mixtures thereof, and the top coat having a thickness of from about 12.5 to about 1250 micrometers.

The invention also relates to a method for preparing a thermal/environmental barrier coating on a substrate formed of a silicon-comprising material, said method comprising:

a) forming an environmental barrier layer overlying the substrate and having a thickness of from about 25 to about 500 micrometers;

b) optionally, forming a transition layer on the environmental barrier layer, the transition layer having a thickness of from about 25 to about 500 micrometers; and c) forming a top coat overlying the environmental barrier layer and any transition layer, the top coat comprising hafnia stabilized with from about 0.5 mole % to about 10 mole % of an oxide of a metal selected from the group consisting of magnesium, calcium, scandium, yttrium, and lanthanide metals, and mixtures thereof, and the top coat having a thickness of from about 12.5 to about 1250 micrometers.

BRIEF DESCRIPTION OF THE DRAWING

The FIGURE is a cross-sectional view of a gas turbine engine component formed of a Si-comprising material and having a thermal/environmental barrier coating system in accordance with one embodiment of the invention.

DETAILED DESCRIPTION OF THE INVENTION

As used herein, the term "comprising" means various compositions, compounds, components, layers, steps and the like can be conjointly employed in the present invention. Accordingly, the term "comprising" encompasses the more restrictive terms "consisting essentially of" and "consisting of."

All amounts, parts, ratios and percentages used herein are by weight unless otherwise specified.

The present invention generally provides a coating system for a substrate formed of a silicon-comprising material, particularly for articles comprising such a substrate that are exposed to high temperatures, including the hostile thermal environment of a gas turbine engine. The substrate is typically formed of a material selected from the group consisting of silicon carbide; silicon nitride; composites having a matrix of at least one of silicon carbide, silicon nitride and silicon; and composites have at least one of a silicon carbide, silicon nitride and silicon matrix reinforced with at least one of silicon carbide, silicon nitride and silicon. Examples of such materials include those with a dispersion of silicon carbide, silicon carbide and/or silicon particles as a reinforcement material in a nonmetallic matrix, as well as those having a silicon carbide, silicon nitride and/or silicon-comprising matrix, and particularly composite materials that employ silicon carbide, silicon nitride and/or silicon as both the reinforcement and matrix materials (e.g., SiC/SiC ceramic matrix composites (CMC)).

The invention relates to a thermal/environmental barrier coating (T/EBC) system that exhibits improved mechanical integrity for high application temperatures that necessitate thick protective coatings, generally on the order of 250 microns or more. The T/EBC system comprises an environmental barrier layer that overlies the surface of the Si-comprising material, and a thermal-insulating outer layer or top coat overlying the inner layer. The top coat comprises hafnia stabilized with from about 0.5 mole % to about 10 mole % of an oxide of a metal selected from the group consisting of magnesium, calcium, scandium, yttrium, and lanthanide metals, and mixtures thereof. In one embodiment, a transition layer is provided between the environmental barrier layer and the top coat. The transition layer has a CTE above that of the environmental barrier layer but less than that of the top coat, and therefore compensates for the difference in CTE between the environment barrier layer and the top coat and/or other coating layers. In addition, the transition layer may serve as a chemical barrier between environmental barrier layer and the top coat to prevent interactions between the layer materials at high temperatures. The top coat comprising stabilized hafnia offers thermal protection to the Si-comprising substrate and the other underlying layers of the coating system. Finally, the transition layer may also serve as a thermal barrier layer that at the same time provides a CTE transition between the environmental barrier layer and the top coat.

According to another embodiment of the invention, a compositionally-graded T/EBC system as described above provides both thermal and environmental protection to a Si-comprising substrate at temperatures up to about 2000° C., particularly when present at a total coating thickness of about 250 micrometers or more, as a result of exhibiting improved mechanical integrity as compared to other coating systems for Si-comprising materials.

The present invention is generally applicable to components that operate within environments characterized by relatively high temperatures, and are therefore subjected to severe thermal cycling and stresses, oxidation, and corrosion. Notable examples of such components include combustor components, high-pressure turbine vanes, and other hot section components of gas turbine engines. A surface region 12 of a hot section component 10 is represented in the FIGURE for purposes of illustrating the invention. The component 10, or at least the surface region 12 of the component 10, is formed of a silicon-comprising material such as a SiC/SiC CMC, although the invention is generally applicable to other materials comprising silicon in any form.

As shown in the FIGURE, the surface region 12 of the component 10 is protected by a multi-layer T/EBC system 14 that includes a thermal-insulating top coat 18. The coating system 14 provides environmental protection to the underlying surface region 12 as well as reduces the operating temperature of the component 10 and interior layers 16 and 20 of the coating system 14, thereby enabling the component 10 to survive within higher temperature environments than otherwise possible. A suitable thickness range for the top coat 18 is from about 12.5 to about 1250 micrometers (about 0.0005 to about 0.050 inches), with a typical range of from about 125 to about 500 micrometers (about 0.005 to about 0.020 inches), depending on the particular application.

The top coat 18 comprises hafnia stabilized with from about 0.5 mole % to about 10 mole % of an oxide of a metal selected from the group consisting of magnesium, calcium, scandium, yttrium, and lanthanide metals, and mixtures thereof. While not intending to be limited by theory, it is believed that hafnia has a CTE lower than the yttria-stabilized zirconia often present in top coats, and that this lower CTE is beneficial for overall cyclic durability of the T/EBC system. Hafnia ions are also heavier than zirconia ions and are expected to have lower diffusion rates so that coatings comprising hafnia are more resistant to sintering. For applications such as turbine engine airfoils, it is often desirable that the top coat have good resistance to erosion by small particles passing through the engine. The top coat should also be resistant to breakage due to impact of larger particles (e.g., pieces of plasma-sprayed YSZ particles coming off from the TBC in the combustor). Monoclinic and tetragonal hafnia crystal structures have higher fracture toughness and better erosion and impact resistance as compared to hafnia's cubic crystal structure. In the present invention, the hafnia in the top coat is stabilized with up to about 10 mole % of a selected metal oxide to maintain the desired tetragonal crystal structure, or a mixture of monoclinic and tetragonal structures at lower amounts of metal oxide stabilizer. At least about 0.5 mole % of the metal oxide stabilizer is desired to make the hafnia sprayable by plasma-spraying methods. It is also believed that monoclinic hafnia coatings have increased thermal conductivity. In the top coats of the invention, the hafnia is typically stabilized with from about 1 mole % to about 9 mole %, more typically with from about 2 mole % to about 8 mole %, of the above metal oxide. The metal oxide is typically selected from the group consisting of magnesia, calcia, scandia, yttria, and ceria, and mixtures thereof. In one embodiment, the top coat 18 comprises hafnia stabilized with yttria, e.g., about 7 weight percent yttria.

The top coat 18 typically also comprise other ceramic materials such as various zirconias, particularly chemically stabilized zirconias, such as yttria-stabilized zirconias, ceria-stabilized zirconias, calcia-stabilized zirconias, scandia-stabilized zirconias, magnesia-stabilized zirconias, india-stabilized zirconias, and ytterbia-stabilized zirconias, as well as mixtures of such stabilized zirconias. See, for example, Kirk-Othmer's Encyclopedia of Chemical Technology, 3rd Ed., Vol. 24, pp. 882-883 (1984), for a description of suitable zirconias. Suitable yttria-stabilized zirconias can comprise from about 1 to about 20% yttria (based on the combined weight of yttria and zirconia), and more typically from about 3 to about 10% yttria. These chemically stabilized zirconias can further include one or more of a second metal (e.g., a lanthanide or actinide) oxide such as dysprosia, erbia, europia, gadolinia, neodymia, praseodymia, urania, and hafnia to further reduce thermal conductivity of the thermal barrier coating. See U.S. Pat. No. 6,025,078 (Rickersby et al), issued Feb. 15, 2000 and U.S. Pat. No. 6,333,118 (Alperine et al), issued Dec. 21, 2001, both of which are incorporated by reference.

The top coat 18 typically comprises from about 10% to about 90%, more typically from about 30% to about 80%, of hafnia and from about 10% to about 90%, more typically from about 20% to about 80%, of zirconia, all on a molar basis. In one embodiment, the top coat comprises from about 50% to about 70% zirconia, from about 20% to about 50% hafnia, and about 5 mole % to about 10% yttria, all on a molar basis.

The major mechanism for degradation of silicon carbide (as well as silicon and other silicon compounds) in a corrosive environment is the formation of volatile silicon hydroxide (Si(OH)$_4$) products. The diffusivity of oxidants in the top coat 18 is generally very high. In order to protect the Si-comprising surface region 12, the coating system 14 comprises an environmental barrier layer 16 beneath the top coat 18 that exhibit low diffusivity to oxidants, e.g., oxygen and water vapor, to inhibit oxidation of the silicon carbide within the surface region 12, while also being sufficiently chemically and physically compatible with the surface region 12 to remain adherent to the region 12 under severe thermal conditions. The environmental barrier layer typically has a thickness of from about 25 to about 500 micrometers, more typically from about 75 to about 250 micrometers.

In one embodiment, the environmental barrier layer 16 comprises an alkaline earth metal aluminosilicate, wherein the alkaline earth metal is barium, strontium, or more typically a mixture thereof, such as BSAS. Suitable BSASs include those comprising from about 0.00 to about 1.00 moles BaO, from about 0.00 to about 1.00 moles SrO, from about 1.00 to about 2.00 moles Al$_2$O$_3$ and from about 0.10 to about 2.00 moles SiO$_2$. Usually, the BSASs have from about 0.00 to about 1.00 moles BaO, from about 0.00 to about 1.00 moles SrO, about 1.00 moles Al$_2$O$_3$ and about 2.00 moles SiO$_2$, wherein the combined moles of BaO and SrO is about 1.00 mole. Typically, the BSASs comprise from about 0.10 to about 0.90 moles (more typically from about 0.25 to about 0.75 moles) BaO, from about 0.10 to about 0.90 moles (more typically from about 0.25 to about 0.75 moles) SrO, about 1.00 moles Al$_2$O$_3$ and about 2.00 moles SiO$_2$, wherein the combined moles of BaO and SrO is about 1.00 moles. A particularly suitable BSAS comprises about 0.75 moles BaO, about 0.25 moles SrO, about 1.00 moles Al$_2$O$_3$ and about 2.00 moles SiO$_2$. See U.S. Pat. No. 6,387,456 (Eaton et al.), issued May 14, 2002, especially column 3, lines 8-27, which is herein incorporated by reference.

A BSAS layer overlying the Si-comprising surface region 12 provides environmental protection and thermal barrier properties due to its low thermal conductivity. BSAS is able to serve as an environmental barrier to the underlying surface region 12, which would exhibit significant silica activity and volatilization if exposed to water vapor at high temperatures. As a result, the BSAS layer is able to inhibit the growth of an interfacial silica layer at the surface region 12 when the component 10 is exposed to the oxidizing environment of a gas turbine engine. In addition, BSAS is physically compliant with a SiC-comprising substrate, such as the surface region 12, and is relatively compatible with the Si-comprising surface region 12 in terms of CTE. A suitable thickness range for the BSAS layer is from about 75 to about 500 micrometers (about 0.005 to about 0.020 inches), depending on the particular application. In one embodiment, the environmental barrier layer has a substantially uniform composition of barium strontium aluminosilicate.

In another embodiment, the environmental barrier layer 16 may comprise mullite or mixtures thereof with yttrium silicate (e.g., Y$_2$O$_3$.SiO$_2$, 2Y$_2$O$_3$.3SiO$_2$, and Y$_2$O$_3$.2SiO$_2$) or an alkaline earth metal aluminosilicate as described above, such as BSAS. However, since mullite itself tends to crack as a result of thermal spray fabrication processing, an environmental barrier layer typically comprises from about 40% to about 80% by weight mullite and from about 20% to about 60% by weight BSAS, yttrium silicate, or calcium aluminosilicate. The above materials may be deposited or formed as one or more separate layers, and they may have a substantially uniform or compositionally graded composition.

Alternatively, the environmental barrier layer 16 may comprise a low CTE rare earth silicate material such as disclosed in U.S. Pat. No. 6,759,151, Lee, issued Jul. 6, 2004, incorporated herein by reference. Such rare earth silicates have a formula selected from the group consisting of (1) RE$_2$O$_3$.SiO$_2$, (2) 2RE$_2$O$_3$.3SiO$_2$, (3) RE$_2$O$_3$.2SiO$_2$ and combinations thereof. RE is a rare earth element selected from the group consisting of Sc, Dy, Ho, Er, Tm, Yb, Lu, Eu, Gd, Th and combinations thereof. Exemplary rare earth oxides are $Sc_2SiO_5$, $Er_2SiO_5$, $Yb_2SiO_5$ and combinations thereof.

The above silicate materials may be deposited as a separate layer on the substrate, alone or as a mixture with other materials (e.g., mullite) as described above, or they may be formed on the substrate in contact with an optional silicon under-layer, as described below.

In one embodiment of the invention, separating the environmental barrier layer 16 and the top coat 18 is a transition layer 20 that has a CTE between that of the environmental barrier layer and the top coat. The transition layer 20 promotes cyclic durability and thus the thermal and environmental protection provided by T/EBC system 14 to the Si-comprising surface region 12 over numerous thermal cycles and at elevated temperatures. The transition layer 20 serves to adhere the environmental barrier layer to the top coat layer, while also preventing interactions between the environmental barrier layer 16 and the top coat 18 at high temperatures. In one embodiment, the transition layer comprises a low CTE oxide material such as mullite or alumina, or mixtures thereof. In another embodiment, the transition layer comprises zirconia, hafnia, a stabilized zirconia such as yttria-stabilized zirconia, a stabilized hafnia such as yttria-stabilized hafnia, or mixtures thereof, with or without mullite and/or alumina. The transition layer 20 typically comprises stabilized hafnia, stabilized zirconia, mullite, alumina, or mixtures thereof, particularly stabilized zirconia, mullite, or mixtures thereof.

The transition layer may have a substantially uniform composition, e.g., alumina or other component having a CTE between that of the top coat and the environmental barrier layer. In another embodiment, the transition layer is a substantially homogeneous mixture of yttria-stabilized zirconia (YSZ) or yttria-stabilized hafnia (YSH), with mullite and/or alumina, with YSZ or YSH comprising up to 90 weight percent of the layer 20. Alternatively, the layer 20 can be made up of discrete sublayers, each with a different composition. In one embodiment, the composition of the sublayer contacting the environmental layer is typically essentially mullite and/or alumina, while the outermost sublayer contacting the top coat 18 is typically essentially YSZ or YSH. For example, the transition layer may comprise sublayers, a first sublayer contacting the environmental barrier layer and having a substantially uniform composition of mullite, and a second sublayer contacting the topcoat and having a substantially uniform composition of yttria-stabilized zirconia. One or more intermediate sublayers may be present in the transition layer and have compositions that are intermediate those of the inner and outer sublayers.

According to another embodiment, the transition layer 20 has a continuously changing composition, from essentially all YSZ or YSH adjacent the top coat 18 to essentially all mullite and/or alumina adjacent the environmental barrier layer 16. In this embodiment, the layer 20 has a decreasing concentration of mullite and/or alumina and an increasing concentration of YSZ or YSH in a direction away from the environmental barrier layer 16. In combination, the higher concentration of mullite and/or alumina adjacent the environmental barrier layer 16 and the higher concentration of YSZ or YSH adjacent the top coat 18 serve to provide a gradually increasing CTE, with a minimum CTE adjacent the environmental barrier layer 16 and a maximum CTE adjacent the top coat 18. In one example, the transition layer is compositionally graded and consists essentially of mullite at an interface of the transition layer with the environmental barrier layer, and consists essentially of yttria-stabilized zirconia at an interface of the transition layer with the top coat, the transition layer having a decreasing concentration of mullite and an increasing concentration of yttria-stabilized zirconia in a direction away from the environmental barrier layer.

A suitable thickness range for the layer 20 is from about 25 to about 500 micrometers (about 0.001 to about 0.020 inches), typically from about 50 to about 250 micrometers, depending on the particular application and the thickness of the environmental barrier layer 16. High application temperatures, e.g., up to 2000° C., typically use thick protective coating systems, generally on the order of 250 micrometers or more. It is with such coating systems that the benefits of the transition layer 20 become more apparent to improve the mechanical integrity of the coating system. The YSZ or YSH constituent of this layer 20 serves to increase its overall CTE to something closer to the top coat 18.

An optional silicon layer may be included between the environmental barrier layer 16 and the surface region 12. Such a silicon layer is useful to improve oxidation resistance of the surface region 12 and enhance bonding between the environmental barrier layer 16 and the surface region if the surface region contains SiC or silicon nitride. A suitable thickness for the silicon layer is from about 12.5 to about 250 micrometers.

As with conventional bond coats and environmental coatings, the environmental barrier layer 16 and the transition layer 20 can be individually deposited by air and vacuum plasma spraying (APS and VPS, respectively), though it is foreseeable that deposition could be performed by other known techniques, such as chemical vapor deposition (CVD) and high velocity oxy-fuel (HVOF). The top coat 18 can also be deposited by known techniques, including plasma spraying and physical vapor deposition (PVD) techniques. Thereafter, a heat treatment may be performed after deposition of the individual layers 16 and 20 and/or top coat 18 to relieve residual stresses created during cooling from elevated deposition temperatures.

The invention thus also provides a method for preparing a thermal/environmental barrier coating on a substrate formed of a silicon-comprising material, said method comprising:
a) forming an environmental barrier layer overlying the substrate and having a thickness of from about 25 to about 500 micrometers;
b) optionally, forming a transition layer on the environmental barrier layer, the transition layer having a thickness of from about 25 to about 500 micrometers; and
c) forming a top coat overlying the environmental barrier layer and any transition layer, the top coat comprising hafnia stabilized with from about 0.5 mole % to about 10 mole % of an oxide of a metal selected from the group consisting of magnesium, calcium, scandium, yttrium, and lanthanide metals, and mixtures thereof, and the top coat having a thickness of from about 12.5 to about 1250 micrometers.

The present invention is particularly useful in providing thermal and environmental protection for Si-comprising materials in newly manufactured articles. However, the invention is also useful in providing such protection for refurbished worn or damaged articles, or in providing such protection for articles that did not originally have a T/EBC system.

While specific embodiments of the method of the present invention have been described, it will be apparent to those skilled in the art that various modifications thereto can be made without departing from the spirit and scope of the present invention as defined in the appended claims.

What is claimed is:

1. An article comprising:
   a) a substrate formed of a silicon-comprising material;
   b) an environmental barrier layer overlying the substrate; and
   c) a top coat overlying the environmental barrier layer, the top coat comprising tetragonal hafnia stabilized with from about 0.5 mole % to about 10 mole % of an oxide of yttrium.

2. An article as recited in claim 1, wherein the substrate is formed of a material selected from the group consisting of silicon carbide; silicon nitride; composites having a matrix of at least one of silicon carbide, silicon nitride and silicon; and composites have at least one of a silicon carbide, silicon nitride and silicon matrix reinforced with at least one of silicon carbide, silicon nitride and silicon.

3. An article as recited in claim 1, wherein the environmental barrier layer comprises an alkaline earth metal aluminosilicate material.

4. An article as recited in claim 3, wherein the environmental barrier layer comprises barium strontium aluminosilicate.

5. An article as recited in claim 1, wherein the top coat comprises tetragonal hafnia stabilized with from about 2 mole % to about 8 mole % of an oxide of yttrium.

6. An article as recited in claim 5, wherein the top coat comprises from about 50% to about 70% zirconia, from about 20% to about 50% of tetragonal hafnia, and from about 5% to about 10% of yttria, all on a molar basis.

7. An article as recited in claim 6, wherein the environmental barrier layer has a substantially uniform composition of barium strontium aluminosilicate.

8. An article as recited in claim 7, wherein the substrate is formed of a material selected from the group consisting of composites having a matrix of at least one of silicon carbide, silicon nitride and silicon, and composites have at least one of a silicon carbide, silicon nitride and silicon matrix reinforced with at least one of silicon carbide, silicon nitride and silicon.

9. An article comprising:
   a) a substrate formed of a silicon-comprising material;
   b) an environmental barrier layer overlying the substrate;
   c) a transition layer overlying the environmental barrier layer; and
   d) a top coat overlying the transition layer, the top coat comprising tetragonal hafnia stabilized with from about 0.5 mole % to about 10 mole % of an oxide of yttrium.

10. An article as recited in claim 9, wherein the substrate is formed of a material selected from the group consisting of silicon carbide; silicon nitride; composites having a matrix of at least one of silicon carbide, silicon nitride and silicon; and composites with at least one of a silicon carbide, silicon nitride and silicon matrix reinforced with at least one of silicon carbide, silicon nitride and silicon.

11. An article as recited in claim 10, wherein the environmental barrier layer has a substantially uniform composition of barium strontium aluminosilicate.

12. An article as recited in claim 11, wherein the environmental barrier layer has a thickness of from about 50 to about 250 micrometers.

13. An article as recited in claim 9, wherein the transition layer comprises stabilized hafnia, stabilized zirconia, mullite, alumina, or mixtures thereof.

14. An article as recited in claim 13, wherein the transition layer has a thickness of from about 25 to about 500 micrometers.

15. An article as recited in claim 14, wherein the transition layer comprises stabilized zirconia, mullite, or mixtures thereof.

16. An article as recited in claim 9, wherein the transition layer comprises sublayers, a first sublayer contacting the environmental barrier layer and having a substantially uniform composition of mullite, and a second sublayer contacting the topcoat and having a substantially uniform composition of yttria-stabilized zirconia.

17. An article as recited in claim 9, wherein the transition layer is compositionally graded and consists essentially of mullite at an interface of the transition layer with the environmental barrier layer, and consists essentially of yttria-stabilized zirconia at an interface of the transition layer with the top coat, the transition layer having a decreasing concentration of mullite and an increasing concentration of yttria-stabilized zirconia in a direction away from the environmental barrier layer.

18. An article as recited in claim 9, wherein the top coat has a thickness of from about 12.5 to about 1250 micrometers.

19. An article as recited in claim 18, wherein the environmental barrier layer has a thickness of from about 50 to about 250 micrometers and the transition layer has a thickness of from about to 50 to about 250 micrometers.

20. An article as recited in claim 19, wherein the top coat comprises tetragonal hafnia stabilized with from about 2 mole % to about 8 mole % of an oxide of yttrium.

21. An article as recited in claim 9, wherein the transition layer comprises stabilized hafnia, stabilized zirconia, mullite, alumina, or mixtures thereof, and the environmental barrier layer has a substantially uniform composition of barium strontium aluminosilicate.

22. A gas turbine engine component comprising a substrate formed of a silicon-comprising material and having a thermal/environmental barrier coating system on a surface thereof, the thermal/environmental barrier coating system comprising:
   a) an environmental barrier layer overlying the substrate and having a thickness of from about 25 to about 500 micrometers;
   b) optionally, a transition layer on the environmental barrier layer, the transition layer having a thickness of from about 25 to about 500 micrometers; and
   c) a top coat overlying the environmental barrier layer and any transition layer, the top coat comprising tetragonal hafnia stabilized with from about 0.5 mole % to about 10 mole % of an oxide of yttrium, and the top coat having a thickness of from about 12.5 to about 1250 micrometers.

23. A gas turbine engine component as recited in claim 22, wherein the substrate is formed of a material selected from the group consisting of silicon carbide; silicon nitride; composites having a matrix of at least one of silicon carbide, silicon nitride and silicon; and composites with at least one of a silicon carbide, silicon nitride and silicon matrix reinforced with at least one of silicon carbide, silicon nitride and silicon.

24. A gas turbine engine component as recited in claim 23, wherein the environmental barrier layer comprises barium strontium alumino silicate.

25. A gas turbine engine component as recited in claim 23, comprising a transition layer that comprises stabilized hafnia, stabilized zirconia, mullite, alumina, or mixtures thereof.

26. A gas turbine engine component as recited in claim 23, comprising a transition layer that comprises sublayers, a first sublayer contacting the environmental barrier layer and having a substantially uniform composition of mullite, and a second sublayer contacting the topcoat and having a substantially uniform composition of yttria-stabilized zirconia.

27. A gas turbine engine component as recited in claim 23, comprising a transition layer that is compositionally graded, the transition layer consisting essentially of mullite at an interface of the transition layer with the environmental baffler layer, and consisting essentially of yttria-stabilized zirconia at an interface of the transition layer with the top coat, the transition layer having a decreasing concentration of mullite and an increasing concentration of yttria-stabilized zirconia in a direction away from the environmental barrier layer.

* * * * *